Sept. 10, 1940.   J. K. KNIGHT, JR   2,214,334
TREE AND BRUSH CUTTER
Filed March 30, 1937   2 Sheets-Sheet 1

Inventor
James K. Knight, Jr.
By Clarence A. O'Brien
Hyman Berman
Attorneys

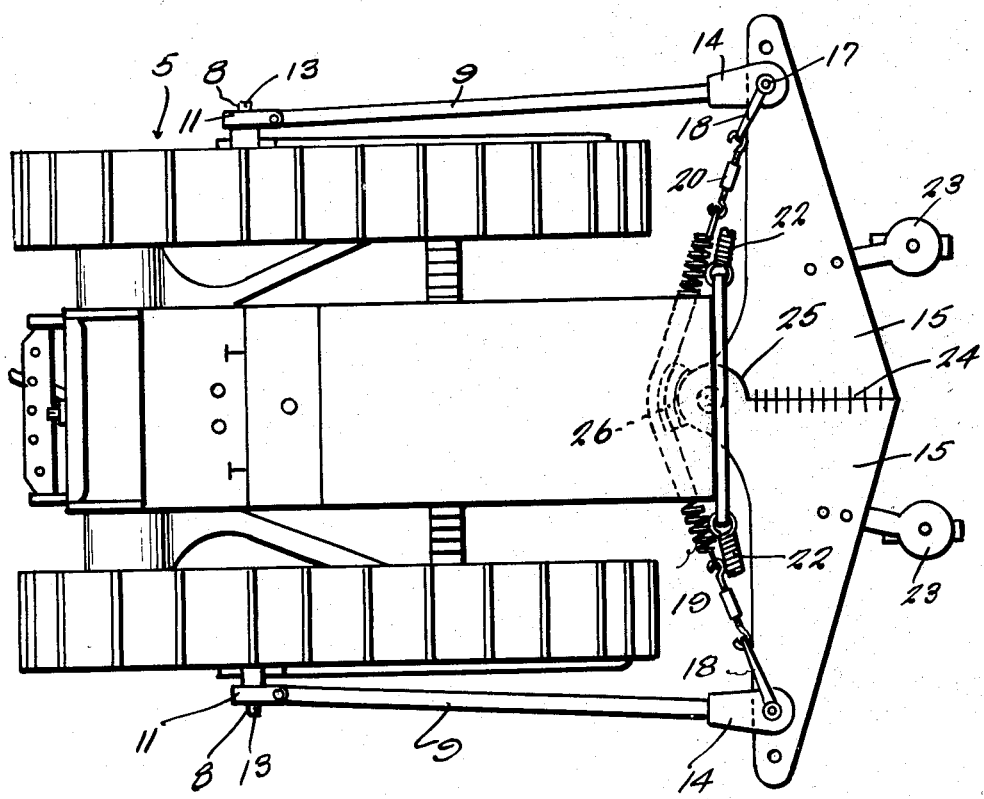
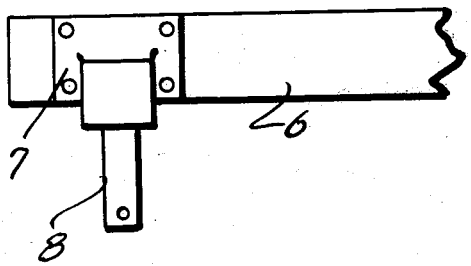
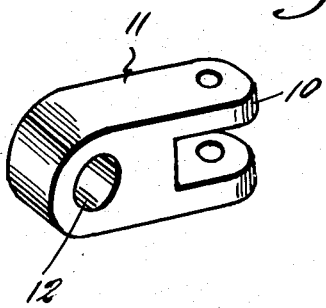

Patented Sept. 10, 1940

2,214,334

UNITED STATES PATENT OFFICE 2,214,334

TREE AND BRUSH CUTTER

James K. Knight, Jr., Bartlett, Tex.

Application March 30, 1937, Serial No. 133,908

4 Claims. (Cl. 56—25)

This invention appertains to new and useful improvements in heavy duty apparatus for cutting down trees and brush.

The principal object of the present invention is to provide a shears attachment for tractors whereby trees and heavy brush can be cut down with a minimum expenditure of time and labor.

Another important object of the invention is to provide a cutting apparatus of the character stated which will be positive acting, sturdy in construction and not susceptible to the ready development of defects.

Another object of the invention is to provide a tree shears whereby the force to effect cutting of the tree is derived from the momentum of the apparatus.

Another object of the invention is to actuate a pair of tree shears by attaching the shear levers to a track tractor, so that the momentum of the tractor will be applied to pivot the shears when they engage an object to be cut.

Another object of the invention is to manipulate a pair of shears with a power vehicle.

These and various other important objects and advantages of the invention will become apparent to the reader of the following specification.

In the drawings:

Figure 3 is a top plan view of the assembly showing the shears in closed position.

Figure 4 is a fragmentary top plan view of one of the trunnions.

Figure 5 is a perspective view of one of the arm connectors.

Figure 1:
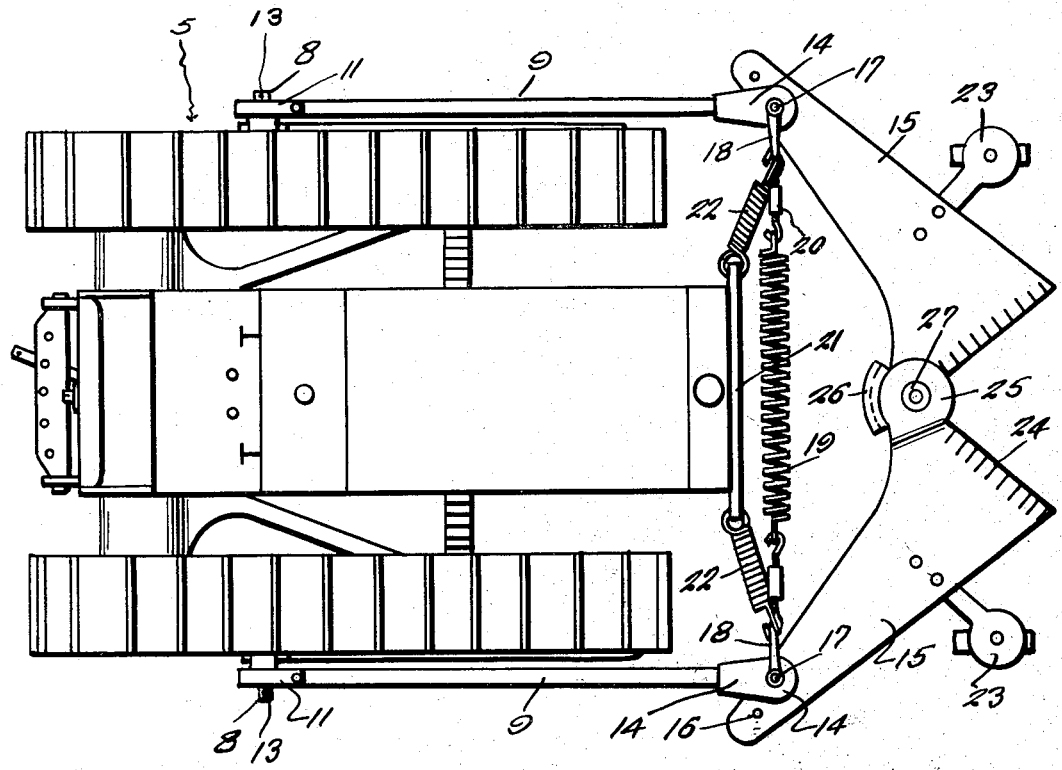
Figure 1 represents a top plan view of the cutting apparatus showing the shears in open position.
Figure 2:
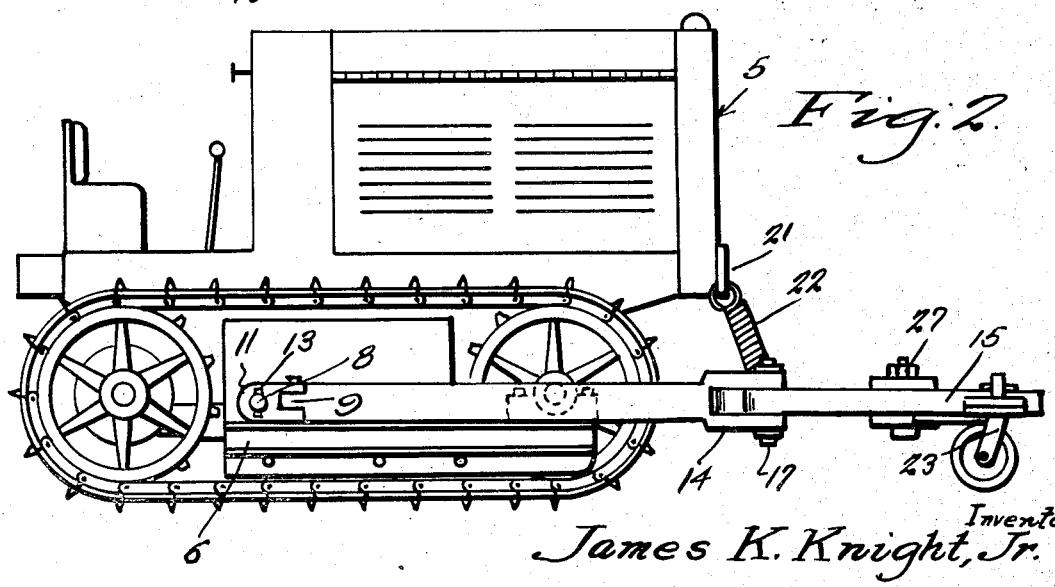
Figure 2 represents a side elevational view of the shears and tractor.

Referring to the drawings wherein like numerals designate like parts, it can be seen that numeral 5 generally refers to the tractor which includes frame members 6 on the opposite sides thereof. On these frame members 6 are plates 7 from which laterally extend the trunnions 8 projecting in outboard direction.

At each side of the tractor is an arm 9 which is provided with a reduced end extension 9' for disposition within the bifurcated portion 10 of the connector 11, which connector is provided with a transversely extending bore 12 for receiving the corresponding trunnion 8. A cotter key or the like 13 disposed through the trunnion prevents displacement of the connector 11 from the trunnion.

A yoke member 14 is provided at the forward end of each of the arms 9 for receiving the reduced end portion of the corresponding shears blade 15, the shears blade 15 being provided with a suitable number of openings 16 at the end portion whereby it may be adjusted with regard to the securing means 17 of the yoke 14. Each of the yokes 14 is secured in place to the corresponding blades 15 along with a clevis 18. For holding the blades 15—15 in open position, an elongated extensible coiled spring 19 has its ends secured as at 20 to the clevises 18. To assist in holding these ends to the arms 9 and the rear ends of the blades 15 suitably elevated and kept from sagging, a cross bar 21 is provided on the front of the tractor 5 and spring members 22 extend from the ends of the bar 21 to the clevises 18.

Particular attention is directed to the configuration of the blades 15 in plan view as seen in Fig. 1. Each blade has the configuration of an isosceles triangle having a short base and where the cutter edge is along the short leg or base of the triangle, the pivot 27 is substantially at one end of the base and the connection openings 16 are near the apex of the similar long legs of the triangle.

A caster wheel 23 is provided in connection with each of the blades 15 and the large ends of the blades are sharpened or otherwise provided with cutting edges 24 the rear ends of which are enlarged as at 25—26 and pivotally secured together as at 27. The enlarged portion 26 is preferably grooved to afford a receiver for the spring 19 when the blades 15 assume the closed position shown in Figure 3.

It can now be seen, that as the tractor progresses toward the object such as a tree or brush which is to be cut, the pivotal point or the cutting edges of the connected blade will strike the object and as the shears assembly will then remain stationary against the tree the tractor in pushing forward due to either its momentum or its power will cause the reduced end portions of the blades to move forwardly because the force is applied to them by the tractor through the bars 9 resulting in the bringing together of the cutting edges 24 of the blades with the result that the object is sheared off.

It seems clear that sufficient lateral movement of the outer ends of the blades is permitted due to the pivoting of the arms 9 to the connection 10 and that a tremendous force can be applied to the shears due to the momentum of the mass of the tractor as well as the power thereof if the power is continued after the impact of the blades against the tree.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. A cutter of the character described comprising a track tractor, a push bar pivoted to each side thereof, a shear blade pivoted to the forward end of each bar, and a common pivot for both of said shear blades so that when said blades are driven against an object the momentum of said tractor is applied through said bars to said blades to pivot them for cutting of the object.

2. A tree or brush shears to be operated by a power vehicle comprising a pair of blade members having inner and outer ends, means to pivot the outer ends to said vehicle, means to pivot the inner ends of the blades together so that when an immovable object is engaged by the blades the movement of the inner pivot with the vehicle is stopped while the vehicle continues to travel and force the outer ends forwardly to pivot the blades about the stopped inner pivot.

3. A tree shears including a power vehicle to carry the shears, a pair of blade members having the outer end of each blade pivoted to the vehicle, a movable pivot connecting the inner ends of the blades together and positioned to be stopped by an immovable object to be sheared so that as the vehicle carries the ends of the blades forwardly the object will be sheared.

4. A tree shears including a pair of blade members, a pivot supported by the inner ends of said blade members, means to carry the shears against an immovable object to stop the travel of the pivot relative to said means, and additional means to pivot the outer ends of said blade members to the carrying means so that the continued travel thereof will turn the blades about the stopped pivot to shear the object.

JAMES K. KNIGHT, Jr.